United States Patent
Sharma et al.

(10) Patent No.: US 10,747,009 B1
(45) Date of Patent: Aug. 18, 2020

(54) SYMMETRICAL FACET FRESNEL COMBINER

(71) Applicant: Facebook Technologies, LLC, Menlo Park, CA (US)

(72) Inventors: Robin Sharma, Redmond, WA (US); Karol Constantine Hatzilias, Kenmore, WA (US); Qi Zhang, Bellevue, WA (US); Andrew John Ouderkirk, Redmond, WA (US); Robert Dale Cavin, Seattle, WA (US); Ying Geng, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 122 days.

(21) Appl. No.: 16/041,212

(22) Filed: Jul. 20, 2018

(51) Int. Cl.
| | |
|---|---|
| *G02B 27/14* | (2006.01) |
| *G02B 27/00* | (2006.01) |
| *G02B 27/01* | (2006.01) |
| *G02B 3/08* | (2006.01) |
| *H04N 5/33* | (2006.01) |

(52) U.S. Cl.
CPC ............ *G02B 27/142* (2013.01); *G02B 3/08* (2013.01); *G02B 27/0093* (2013.01); *G02B 27/0172* (2013.01); *G02B 2027/0178* (2013.01); *H04N 5/33* (2013.01)

(58) Field of Classification Search
CPC ........ G02B 3/08; G02B 5/045; G02B 5/1876; G02B 27/0172; G02B 27/141; G02B 27/142
USPC .......................................... 359/742, 630, 634
See application file for complete search history.

(56) References Cited

U.S. PATENT DOCUMENTS

| | | | |
|---|---|---|---|
| 7,102,820 B2* | 9/2006 | Peterson ................... | G02B 3/08 359/457 |
| 8,384,999 B1* | 2/2013 | Crosby ............... | G02B 27/0172 359/631 |
| 9,810,904 B1* | 11/2017 | Bierhuizen ........ | G02B 27/0172 |
| 2017/0123526 A1* | 5/2017 | Trail ................... | G06K 9/00617 |
| 2019/0101757 A1* | 4/2019 | Martinez ............ | G02B 27/0172 |
| 2019/0129174 A1* | 5/2019 | Perreault ............ | G02B 27/0961 |

\* cited by examiner

*Primary Examiner* — Zachary W Wilkes
(74) *Attorney, Agent, or Firm* — Freestone Intellectual Property Law PLLC; Aaron J. Visbeek (57) ABSTRACT

An optical combiner for a head mounted display includes a refractive material having a refractive index and a Fresnel surface formed in the refractive material. The Fresnel surface includes a plurality of Fresnel features that include an active surface and a draft surface. An active surface angle supporting the active surface is substantially the same as a draft surface angle supporting the draft surface such that active surface and the draft surface are symmetrical.

20 Claims, 6 Drawing Sheets

SYMMETRICAL FACET FRESNEL COMBINER

TECHNICAL FIELD

This disclosure relates generally to optics, and in particular to Fresnel structures.

BACKGROUND INFORMATION

Lenses and other optical elements are ubiquitous in both consumer and commercial products such as cameras, displays, and sensors. Fresnel lenses were famously developed in the early 1800s and originally deployed in lighthouses to increase the distance that the light from the lighthouse could be viewed by ships. Using Fresnel lenses can be advantageous in that they are thinner (and often lighter) than conventional lenses with similar optical power. In some contexts, Fresnel optical elements are used to provide lensing for particular portions of the light spectrum. The active surfaces in Fresnel optical elements are designed to provide the desired lensing power of the Fresnel optical element.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a Fresnel combiner and a head mounted display (HMD) utilizing the Fresnel combiner are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this disclosure, the term "Fresnel facet" and Fresnel feature" may be used interchangeably to refer to the same structure of the disclosed embodiments. For example, the structure associated with reference number 210 or reference number 310 may be referred to as either a Fresnel feature or a Fresnel facet. The Fresnel optical elements of this disclosure may be used in a head mounted display (HMD) to direct infrared light reflecting off an eye of a wearer of the HMD to a camera while also allowing scene light to propagate to the eye(s) of the wearer.

Conventional features of a Fresnel surface include an active surface that provides the desired optical power for the Fresnel element and the draft surface (and corresponding draft angle) that merely supports the active surface. Since the active surface of a Fresnel feature provides the desired optical power, the area of the active surface is maximized in conventional Fresnel designs to focus or direct the incident light. In contrast, any surface area taken up by the draft surface (which merely supports the active surface) essentially wastes incoming light because the draft surface is not designed to focus/direct the incoming light. Consequently, conventional Fresnel optical elements include Fresnel features where the active surface is larger than the draft surface so light is not lost/wasted. This may correspond with a draft angle that supports the draft surface being much larger than an active angle that supports the active surface in conventional Fresnel optical elements. Conventional Fresnel optical elements may also have the length of the active surface being longer than the length of the draft surface.

In contrast to conventional Fresnel optical elements, embodiments of this disclosure include symmetrical Fresnel facets where the draft surface angle and the active surface angle are substantially the same so that the Fresnel features/facet is symmetrical. This is counterintuitive because the larger draft surface fails to focus or redirect incoming light and therefore a much larger portion of incoming light is essentially wasted for imaging purposes as it encounters the draft surface. However, testing and modeling by the Applicant indicates that having substantially symmetrical Fresnel facets substantially increases the quality of see-through scene light (on the way to an eye) that passes through a Fresnel optical combiner having substantially symmetrical Fresnel facets. In particular, certain optical aberrations in see-through scene light are reduce by having symmetrical Fresnel facets in comparison to the conventional Fresnel designs. Therefore, in the particular case of a Fresnel optical combiner that has Fresnel facets coated with a "hot mirror" (reflecting infrared light and passing visible light), the substantially increased quality of the see-through visible light may be prioritized over the loss of infrared imaging light that hot mirror coated Fresnel features are configured to direct to a camera for eye-tracking purposes, for example. Furthermore, embodiments of the disclosure include Fresnel facets that have both of the active surface and draft surface of the Fresnel features coated with a hot mirror. Embodiments of the disclosure also include a Fresnel surface having symmetrical facets being immersed in an optical material having a refractive index that is the same as a refractive material that the Fresnel surface is formed in, which allows the hot mirror coated Fresnel surface to be invisible or unnoticed by a wearer of a HMD that includes the disclosed Fresnel combiner. These and other embodiments are described in detail below with respect to FIGS. 1-6.

Figure 1:
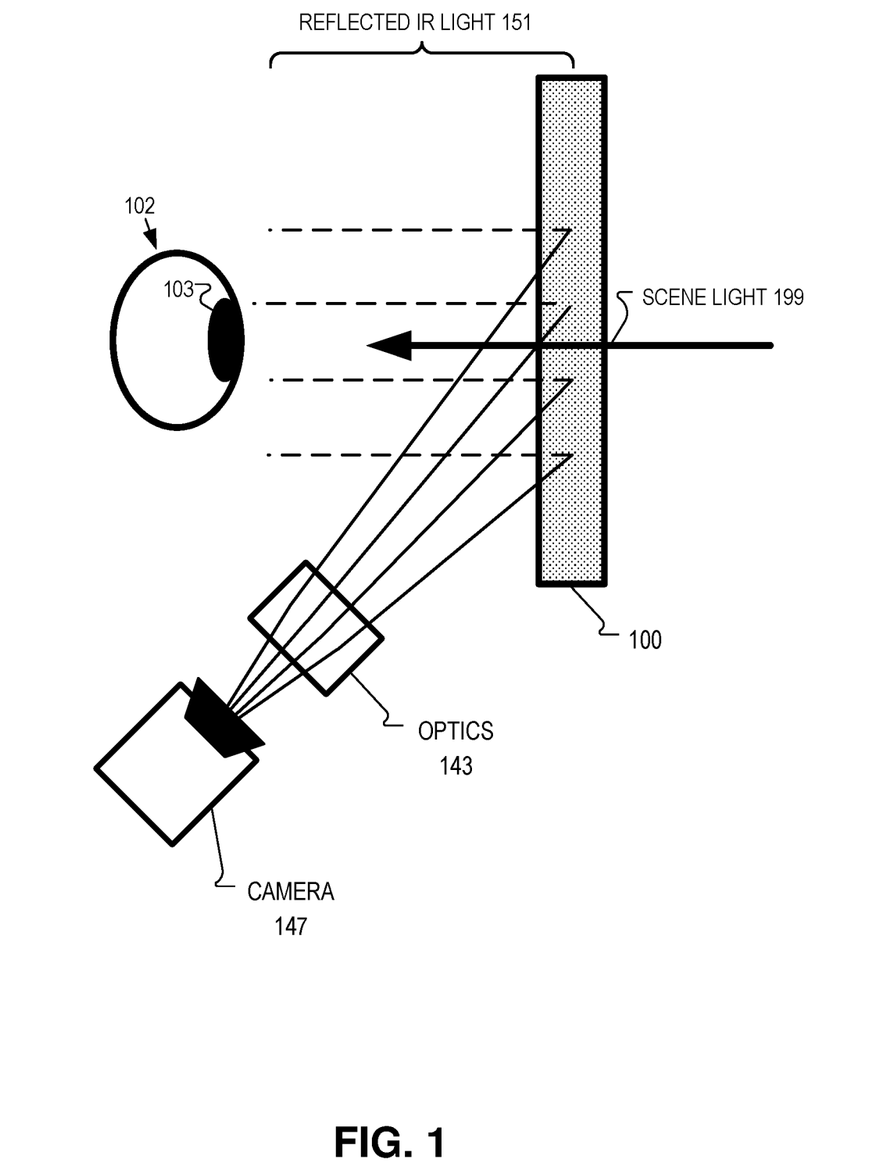
FIG. 1 illustrates an example Fresnel combiner redirecting incoming infrared light to a camera, in accordance with an embodiment of the disclosure.

FIG. 1 illustrates an optical combiner 100 that includes a Fresnel optical element that directs reflected infrared light 151 to camera 147 while allowing scene light 199 to propagate through optical combiner 100 to eye 102, in accordance with an embodiment of the disclosure. Reflected infrared light 151 is reflected from eye 102 and a Fresnel optical reflector included in optical combiner 100 directs and focuses the infrared light to camera 147. The Fresnel optical reflector included in optical combiner 100 may be an off-axis Fresnel lensing shape to direct reflected infrared light 151 to camera 147. Optics 143 may include one or more lenses to assist in focusing the infrared light for camera 147. Camera 147 may be a CMOS image sensor that includes a filter that passes infrared light while rejecting visible light (e.g. wavelength of 380 nm-730 nm). Camera 147 may be included in an HMD such as HMD 600 that will be discussed in more detail in connection with the description of FIG. 6. Eye 102 includes pupil 103 and may be illuminated by infrared light emitted from one or more diodes (e.g. LED) included in an HMD. Camera 147 may be configured to image eye 102 to determine a position of pupil 103 for eye-tracking purposes.

Figure 2A:
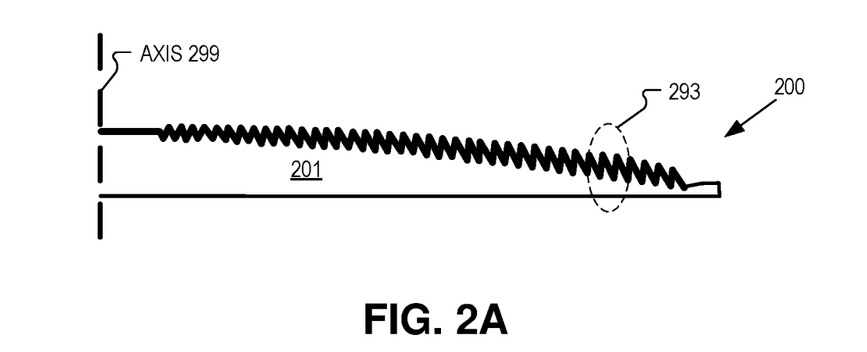
FIGS. 2A and 2B illustrate a portion of a Fresnel optical element having a Fresnel surface including active surfaces and draft surfaces, in accordance with an embodiment of the disclosure, in accordance with an embodiment of the disclosure.

FIG. 2A illustrates a side view of an example conventional Fresnel surface 200 formed in a refractive material 201. The illustrated Fresnel surface 200 is rotationally symmetric around a central axis 299, although not all Fresnel optical elements are rotationally symmetric. FIG. 2A illustrates that the Fresnel features of the Fresnel surface may increase in size as a distance of the Fresnel feature from the central axis 299 increases.

Figure 2B:
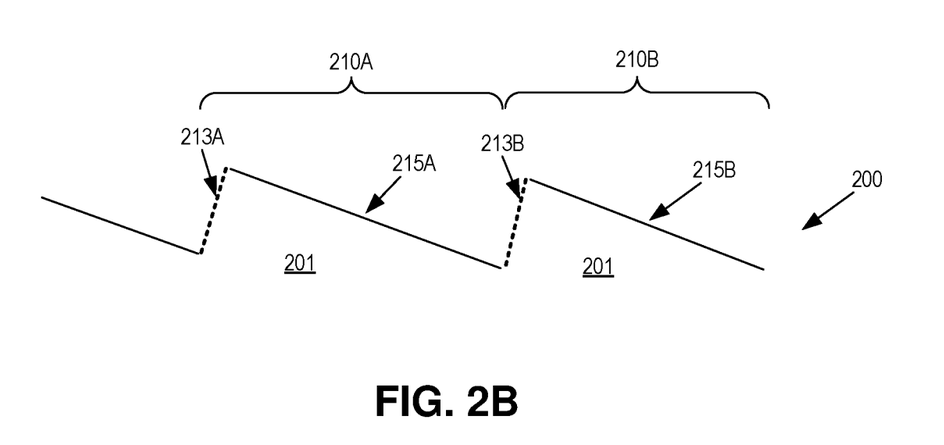

FIG. 2B illustrates a zoomed-in view of view 293 of FIG. 2A. FIG. 2B includes Fresnel features 210A and 210B. Conventional Fresnel features 210 each include a draft surface 213 (dashed lines) and an active surface 215 (solid line). Active surfaces 215 provide the optical power for Fresnel surface 200. Although only two Fresnel features are illustrated as examples throughout the disclosure, those skilled in the art understand that Fresnel optical element may have many more Fresnel features 210 to provide optical power.

Figure 3:
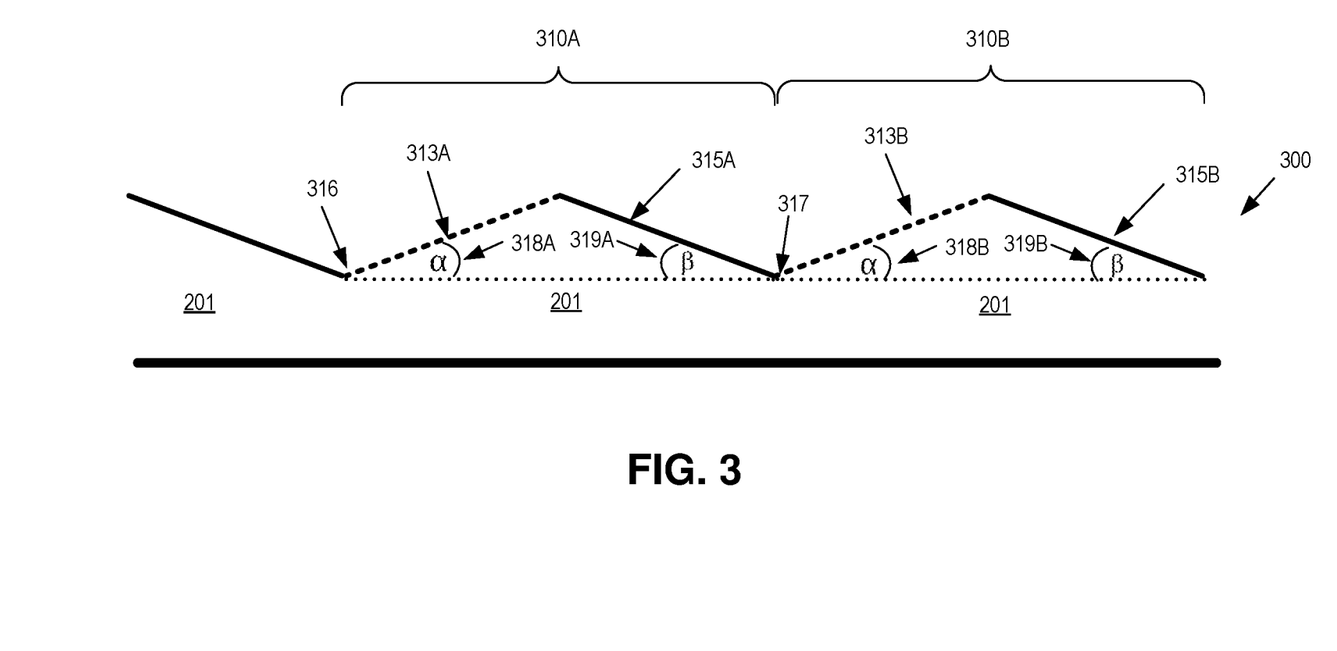
FIG. 3 illustrates an example Fresnel surface having symmetrical Fresnel features that include an active surface and a draft surface, in accordance with an embodiment of the disclosure.

FIG. 3 illustrates a side view of an example Fresnel surface 300 having symmetrical Fresnel features 310 that include an active surface 315 and a draft surface 313, in accordance with an embodiment of the disclosure. Fresnel surface 300 is formed in refractive material 201. Refractive material 201 may include at least one of polymethylmethacrylate (PMMA), polycarbonate, cyclic-olefin polymer (e.g. Zeonex™), polystyrene, polyacrylate, polyester (e.g. OKP-4™), or polydimethysiloxane. Refractive material 201 may include other polymers containing one or more functional groups selected from the group of aliphatic, aromatic, thio, amines, or halogens.

Fresnel surface 300 includes a first Fresnel feature/facet 310A that includes draft surface 313A (illustrated with dashed line) and an active surface 315A (illustrated with solid line). Fresnel surface 300 also includes a second Fresnel feature/facet 310B that includes a draft surface 313B (illustrated with dashed line) and an active surface 315B (illustrated with solid line). Although only two Fresnel facets 310 are illustrated in FIG. 3, those skilled in the art understand that the designs disclosed herein may be applied to all of the Fresnel facets in a Fresnel optical element.

In FIG. 3, draft surface 313A is supported by draft surface angle (α) 318A and active surface 315A is supported by active surface angle (β) 319A. Draft surface angle (α) 318A and active surface angle (β) 319A are the same or substantially the same so that facet 310A is symmetrical or near-symmetrical. Draft surface angle (α) 318A and active surface angle (β) 319A are less than 35 degrees, in some embodiments. Active surface angle (β) 319A is measured from the active surface 315A to a boundary line between valleys of adjacent Fresnel facets and the draft surface angle (α) 318A is measured from the draft surface 313A to the boundary line. In FIG. 3, the dotted imaginary boundary line associated with facet 310A is illustrated between valleys 316 and 317 of the adjacent Fresnel facets.

Fresnel facet 310B is also symmetrical in FIG. 3 and draft surface angle (α) 318B and active surface angle (β) 319B are the same or substantially the same. In one embodiment, draft surface angle (α) 318B is the same as draft surface angle (α) 318A and active surface angle (β) 319A is the same as active surface angle (β) 319B.

In some embodiments, draft surface angle (α) 318B is different than draft surface angle (α) 318A and active surface angle (β) 319A is different than active surface angle (β) 319B. In these embodiments, adjacent or neighboring facets 310 are still symmetrical, although the draft surface angle and active surface angle are different between symmetrical facets. In one embodiment, the draft surface angle and active surface angle of the symmetrical facets 310 progressively increase as the facets get further from the center of a Fresnel optical element that includes Fresnel surface 300. In another embodiment, the draft surface angle and active surface angle of the symmetrical facets progressively decrease as the facets get further from the center of a Fresnel optical element that includes Fresnel surface 300. In some embodiments, Fresnel surface 300 is designed to be an off-axis reflector and the active surface angles (β) 319 of the Fresnel surface are configured to provide off-axis optical power and the draft surface angles (α) 318 are matched to the corresponding active surface angles (β) 319 so that the respective facets are symmetrical. Since adjacent facets 310 are symmetrical, the active surface 315 and draft surface 313 of a particular facet 310 may have the same length. In contrast, conventional facets 210 in FIGS. 2A and 2B have the active surface 215 being longer than the draft surface 213 and the active surface angle is less than the draft surface angle in FIGS. 2A and 2B.

Figure 4:
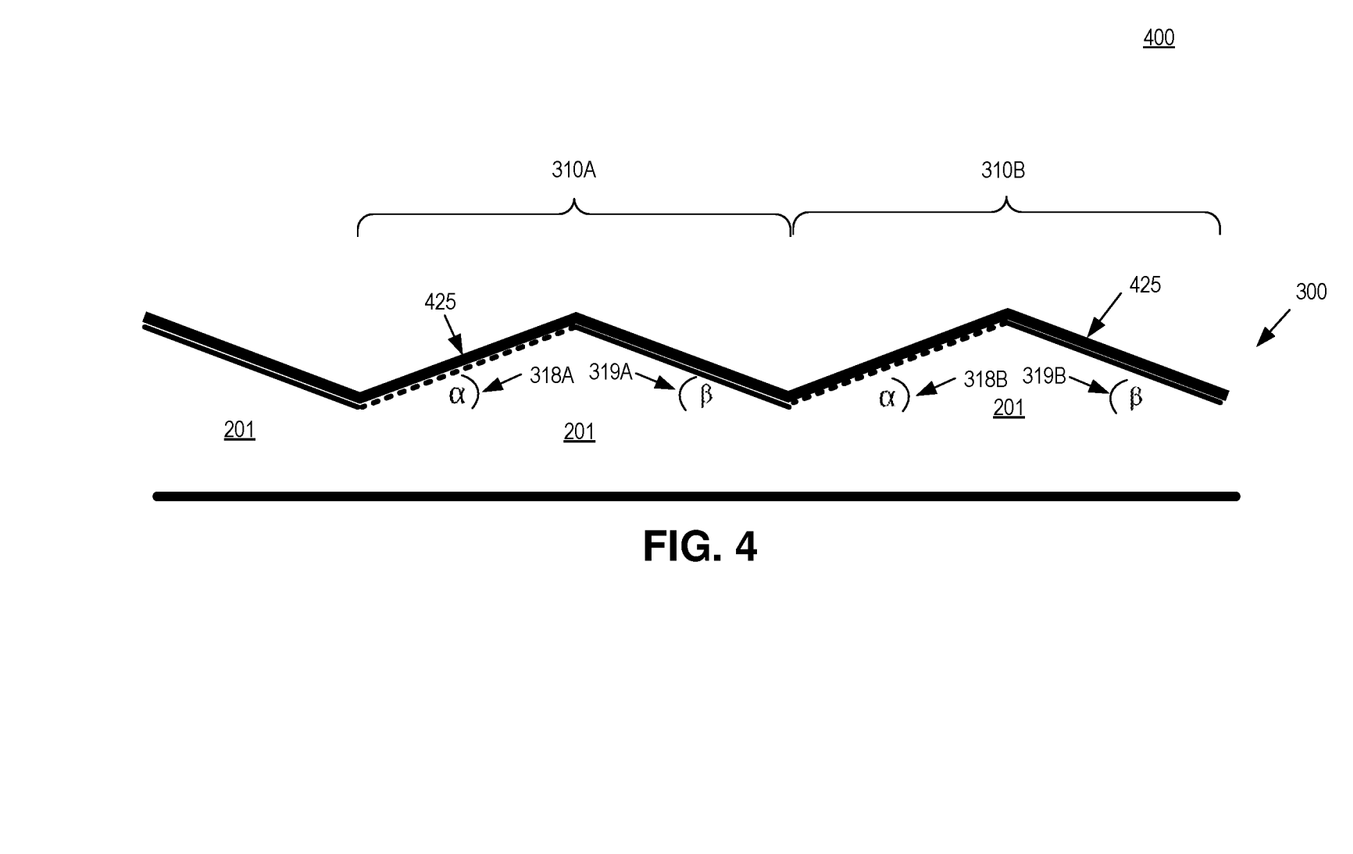
FIG. 4 illustrates an example Fresnel surface having a coating disposed over symmetrical Fresnel features, in accordance with an embodiment of the disclosure.

FIG. 4 illustrates an example optical structure 400 having a coating 425 disposed over symmetrical Fresnel features 310, in accordance with an embodiment of the disclosure. Optical structure 400 includes the coating 425 disposed on the Fresnel surface 300 of FIG. 3 and thus Fresnel features 310 may have the same characteristics as the embodiments described with respect to FIG. 3. In FIG. 4, coating 425 is disposed on the active surfaces 315 and the draft surfaces 313 of the Fresnel features 310. Coating 425 may be a multilayer dielectric coating. Coating 425 may be a hot mirror coating, for example. The hot mirror coating may reflect infrared light while passing substantially all light in the visible spectrum. Infrared coatings with a relatively high effective index may be utilized as coating 425 to reduce phase shift (i.e. the rate of shift of the red band edge as a function of angle) and to reduce the thickness of coating 425 while still achieving similar reflectivity and bandwidth properties as lower effective index coatings. Higher index polymers used as refractive material 201 may allow higher effective (average of high and low index layers) index dielectric coatings as coating 425 and reduce the Fresnel angles.

Figure 5:
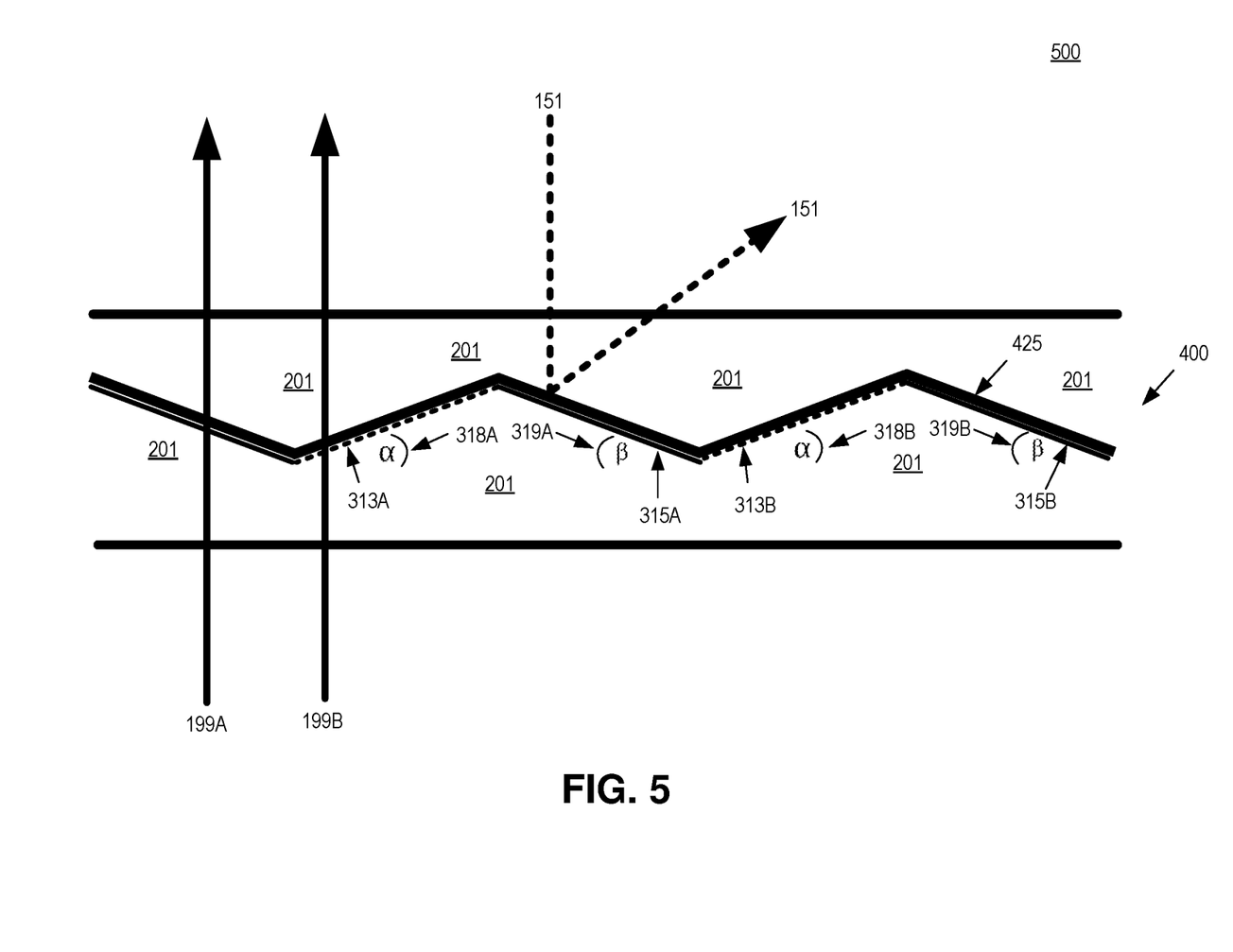
FIG. 5 illustrates an example Fresnel surface having a coating disposed over symmetrical Fresnel features where the Fresnel surface is immersed in a material having a same refractive index as a refractive material that the Fresnel surface is formed in, in accordance with an embodiment of the disclosure.

FIG. 5 illustrates an example Fresnel surface having coating 425 disposed over symmetrical Fresnel features where the Fresnel surface is immersed in a material having a same refractive index as a refractive material that the Fresnel surface is formed in, in accordance with an embodiment of the disclosure. Optical structure 400 and coating 425 is "immersed" in a transparent material having a same refractive index as the refractive material 201. In the illustrated embodiment of FIG. 5, coating 425 is immersed in the same refractive material 201 that the Fresnel surface 300 is formed in. In other embodiments, the immersing material is different than the refractive material 201. In one embodiment, a rigid replica layer that is a negative image of Fresnel surface 300 is bonded to coating 425 and optical structure 400 where the rigid replica layer has the same refractive index as material 201. The rigid replica layer may be bonded with an index matching material. In one embodiment, replica layer is a cured material that was poured or injected onto coating 425 and allowed to cure, where the cured material has a same refractive index as the refractive material 201.

The Fresnel surface and coating 425 in FIG. 5 may be configured to direct and focus infrared light 151 reflected off an eye of a wearer of an HMD to a camera while passing scene light (visible light) 199 to an eye of a wearer of an HMD. The top of the immersive material is illustrated as flat and parallel to the bottom of the refractive material 201 that the Fresnel surface is formed in so that the optical path length of the two different scene light rays 199A and 199B is the same. Notably, coating 425 is also disposed over both the draft surfaces 313 and the active surfaces 315 so that scene light rays 199A and 199B have the same optical path length rather than becoming out of phase if the draft surfaces 313 was not coated with coating 425. Out of phase scene light 199 may cause undesirable optical artifacts (e.g. rainbow effect, ghost images, and other stray light issues) that are noticeable by a wearer of an HMD that is viewing scene light through an optical combiner.

Since scene light 199 is visible light and where coating 425 is a hot mirror, the scene light 199 passes through optical structure unimpeded because the Fresnel surface 300 is "invisible" to the visible light 199. In contrast, reflected infrared light 151 would be reflected by a hot mirror coating layer 425. Fresnel surface 300 may be configured to direct and focus the infrared light 151 reflected off an eye of a wearer of an HMD to a camera while passing scene light (visible light) 199 to an eye of a wearer of an HMD.

Figure 6:
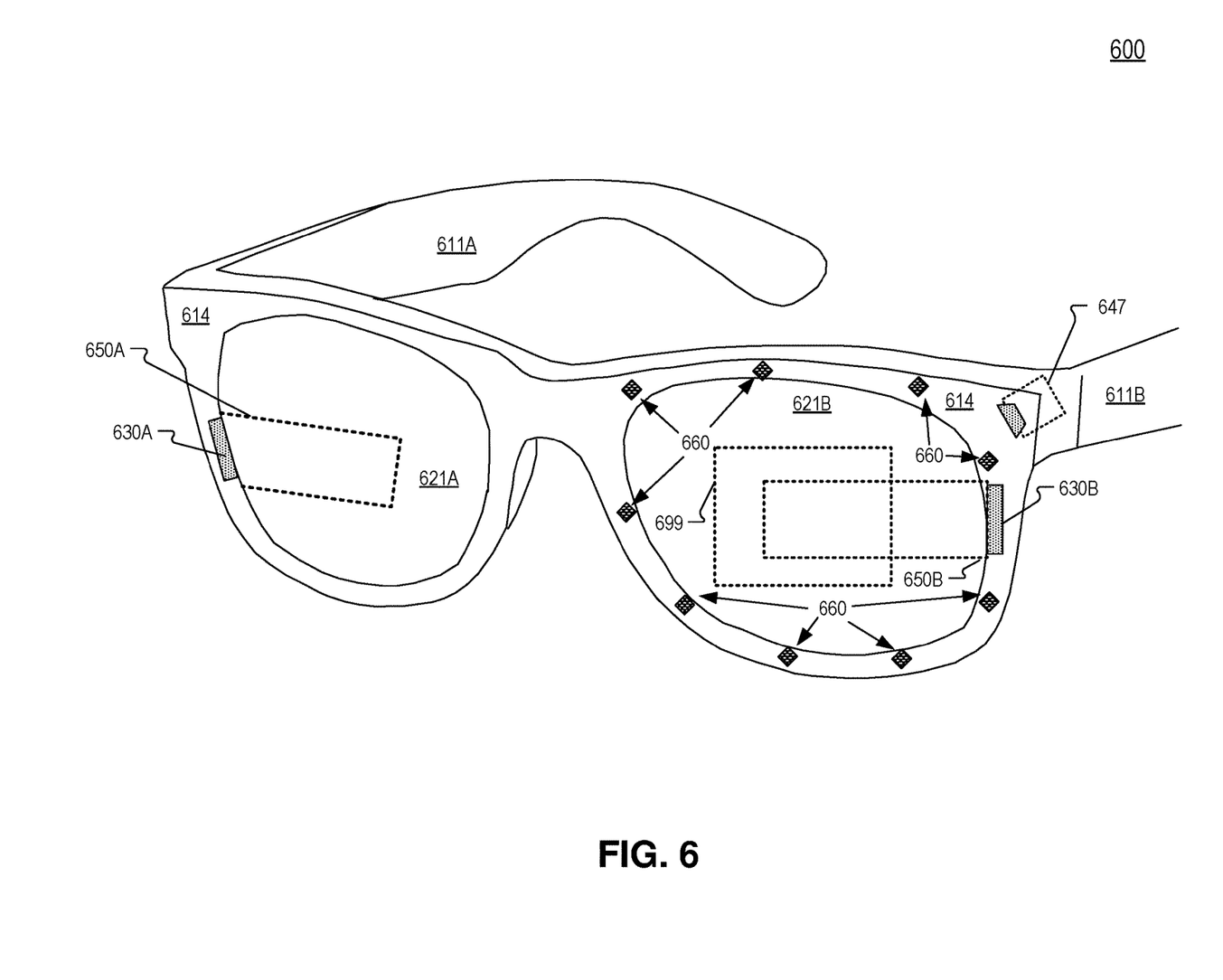
FIG. 6 illustrates an example head mounted display (HMD) that may include a Fresnel surface for directing infrared light reflected off an eye to a camera, in accordance with an embodiment of the disclosure.

FIG. 6 illustrates an example HMD 600 that may include a Fresnel surface for directing infrared light reflected off an eye to a camera, in accordance with an embodiment of the disclosure. HMD 600 includes frame 614 coupled to arms 611A and 611B. Lenses 621A and 621B are mounted to frame 614. Lenses 621 may be prescription lenses matched to a particular wearer of HMD or non-prescription lenses. The illustrated HMD 600 is configured to be worn on or about a head of a user of the HMD.

In FIG. 6, each lens 621 includes a waveguide 650 to direct image light generated by a display 630 to an eyebox area for viewing by a wearer of HMD 600. Display 630 may include an LCD, an organic light emitting diode (OLED) display, micro-LED display, quantum dot display, pico-projector, or liquid crystal on silicon (LCOS) display for directing image light to a wearer of HMD 600.

The frame 614 and arms 611 of the HMD 600 may include supporting hardware of HMD 600. HMD 600 may include any of processing logic, wired and/or wireless data interface for sending and receiving data, graphic processors, and one or more memories for storing data and computer-executable instructions. In one embodiment, HMD 600 may be configured to receive wired power. In one embodiment, HMD 600 is configured to be powered by one or more batteries. In one embodiment, HMD 600 may be configured to receive wired data including video data via a wired communication channel. In one embodiment, HMD 600 is configured to receive wireless data including video data via a wireless communication channel.

Lenses 621 may appear transparent to a user to facilitate augmented reality or mixed reality where a user can view scene light from the environment around her while also receiving image light directed to her eye(s) by waveguide(s) 650. Consequently, lenses 621 may be considered (or include) an optical combiner. In some embodiments, image light is only directed into one eye of the wearer of HMD 600. In an embodiment, both displays 630A and 630B are included to direct image light into waveguides 650A and 650B, respectively.

The example HMD 600 of FIG. 6 includes an array of infrared emitters (e.g. infrared LEDs) 660 disposed around a periphery of lens 621B in frame 614. The infrared emitters emit light in an eyeward direction to illuminate an eye of a wearer of HMD 600 with infrared light. In one embodiment, the infrared light is centered around 850 nm. Infrared light from other sources may illuminate the eye as well. The infrared light may reflect off the eye and be received by a Fresnel reflector 699 selectively coated with a hot mirror and configured to direct and focus the reflected infrared light to camera 647. Fresnel reflector 699 may have an off-axis Fresnel lensing shape to direct the reflected infrared light to camera 647. In this way, camera 647 is able to image the eye of a wearer of HMD 600. Camera 647 may be mounted on the inside of the temple of HMD 600. The images of the eye captured by camera 647 may be used for eye-tracking purposes. The optical structures disclosed in FIGS. 3-5 may be utilized as Fresnel reflector 699. Although the optical structure may be in the user's vision, the Fresnel surface passes scene light to the eye essentially unaffected by the Fresnel surface, as discussed in connection with FIGS. 3-5. The Fresnel reflector 699 can be included in lenses 621 as covering the whole waveguide 650 or covering a portion of waveguide(s) 650. Although camera 647, infrared emitters 660, and Fresnel reflector 699 are illustrated on only one side of HMD 600, they of course may be duplicated on the other side of HMD 600 to facilitate infrared imaging of both eyes of a wearer of HMD 600.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical combiner for a head mounted display, the optical combiner comprising:
    a refractive material having a refractive index; and
    a Fresnel surface formed in the refractive material, wherein the Fresnel surface includes a plurality of Fresnel features that include an active surface and a draft surface, wherein an active surface angle supporting the active surface is substantially the same as a draft surface angle supporting the draft surface such that active surface and the draft surface are symmetrical, wherein the active surface angle and the draft surface angle of each of the plurality of Fresnel features progressively vary at least partially based on a distance of each of the plurality of Fresnel features from a center of the refractive material.

2. The optical combiner of claim 1 further comprising:
    a coating disposed on the active surface and the draft surface of the Fresnel features.

3. The optical combiner of claim 2, wherein the coating is configured to pass visible light and reflect near-infrared light.

4. The optical combiner of claim 3, wherein the coating is immersed in a transparent material having a same refractive index as the refractive material.

5. The optical combiner of claim 4, wherein the transparent material is the same as the refractive material.

6. The optical combiner of claim 2, wherein the coating is a multilayer dichroic coating.

7. The optical combiner of claim 1, wherein the active surface angle is measured from the active surface to a boundary line between valleys of adjacent Fresnel features included in the plurality of Fresnel features, and wherein the draft surface angle is measured from the draft surface to the boundary line.

8. The optical combiner of claim 1, wherein a first Fresnel feature in the plurality of Fresnel features has a first draft surface angle that is substantially the same as a first active surface angle of the first Fresnel feature, and wherein a second Fresnel feature in the plurality of Fresnel features has a second draft surface angle that is substantially the same as a second active surface angle of the second Fresnel feature, the first active surface angle differing from the second active surface angle.

9. The optical combiner of claim 1, wherein the refractive material includes at least one of polymethylmethacrylate (PMMA), polycarbonate, cyclic-olefin polymer, polystyrene, polyacrylate, polyester, polydimethysiloxane, or other polymers containing one or more functional groups selected from the group of aliphatic, aromatic, thio, amines, or halogens.

10. The optical combiner of claim 1, wherein the Fresnel surface is configured as an off-axis reflector.

11. A head mounted display (HMD) comprising:
    a camera; and
    an optical combiner configured to pass visible light to an eyebox area and configured to direct infrared light to the camera, wherein the infrared light is received from the eyebox area, the optical combiner including:
        a refractive material having a refractive index; and
        a Fresnel surface formed in the refractive material, wherein the Fresnel surface includes a plurality of Fresnel features that include an active surface and a draft surface, wherein an active surface angle supporting the active surface is substantially the same as a draft surface angle supporting the draft surface such that active surface and the draft surface are symmetrical, wherein the active surface angle and the draft surface angle of each of the plurality of Fresnel features progressively vary at least partially based on a distance of each of the plurality of Fresnel features from a center of the refractive material.

12. The HMD of claim 11, wherein the optical combiner further includes a coating disposed on the active surface and the draft surface of the Fresnel features.

13. The HMD of claim 12, wherein the coating is configured to pass visible light and reflect near-infrared light.

14. The HMD of claim 13, wherein the coating is bonded to a transparent material having a same refractive index as the refractive material, wherein a bonding agent that bonds the transparent material to the coating is index matched to the refractive index.

15. The HMD of claim 11, wherein the active surface angle is measured from the active surface to a boundary line between valleys of adjacent Fresnel features included in the plurality of Fresnel features, and wherein the draft surface angle is measured from the draft surface to the boundary line.

16. The HMD of claim 11, wherein the active surface angle is less than 35 degrees and greater than 0 degrees.

17. The HMD of claim 11, wherein the refractive material includes at least one of polymethylmethacrylate (PMMA), polycarbonate, cyclic-olefin polymer, polystyrene, polyacrylate, polyester, polydimethysiloxane, or other polymers containing one or more functional groups selected from the group of aliphatic, aromatic, thio, amines, or halogens.

18. The HMD of claim 11, wherein the active surface and the draft surface have a same length.

19. The HMD of claim 11 further comprising:
at least one infrared source configured to emit the infrared light toward the eyebox area, wherein the camera includes a filter that is configured to pass the infrared light emitted by the at least one infrared source and reject other light.

20. The HMD of claim 11 further comprising:
an optic disposed between the camera and the optical combiner, wherein the optic is configured to focus the infrared light for the camera.

* * * * *